G. V. ANDERSON.
GUN MOUNT AND CONTROL.
APPLICATION FILED JULY 5, 1917.
1,387,678.
Patented Aug. 16, 1921.
6 SHEETS—SHEET 4.
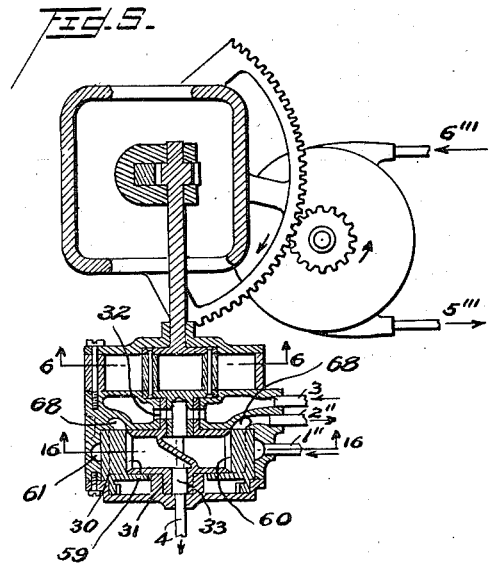
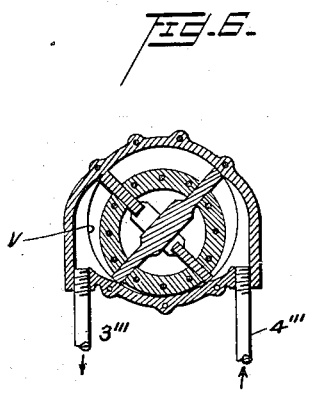
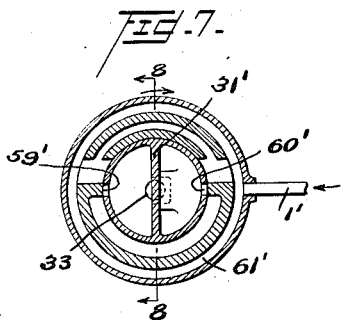
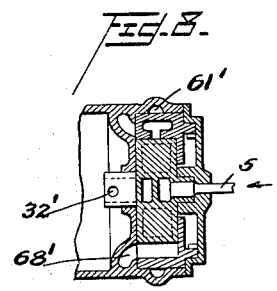
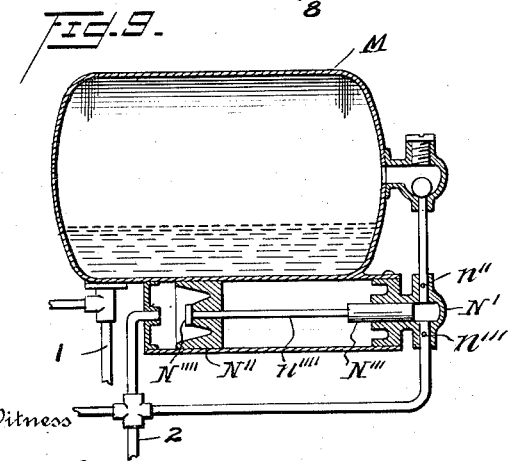
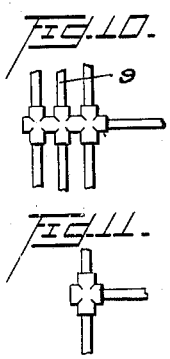
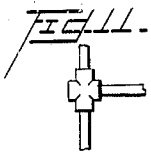
Inventor
Gilbert V. Anderson
Witness
Harold Strauss
By Samuel W. Foster
his Attorney

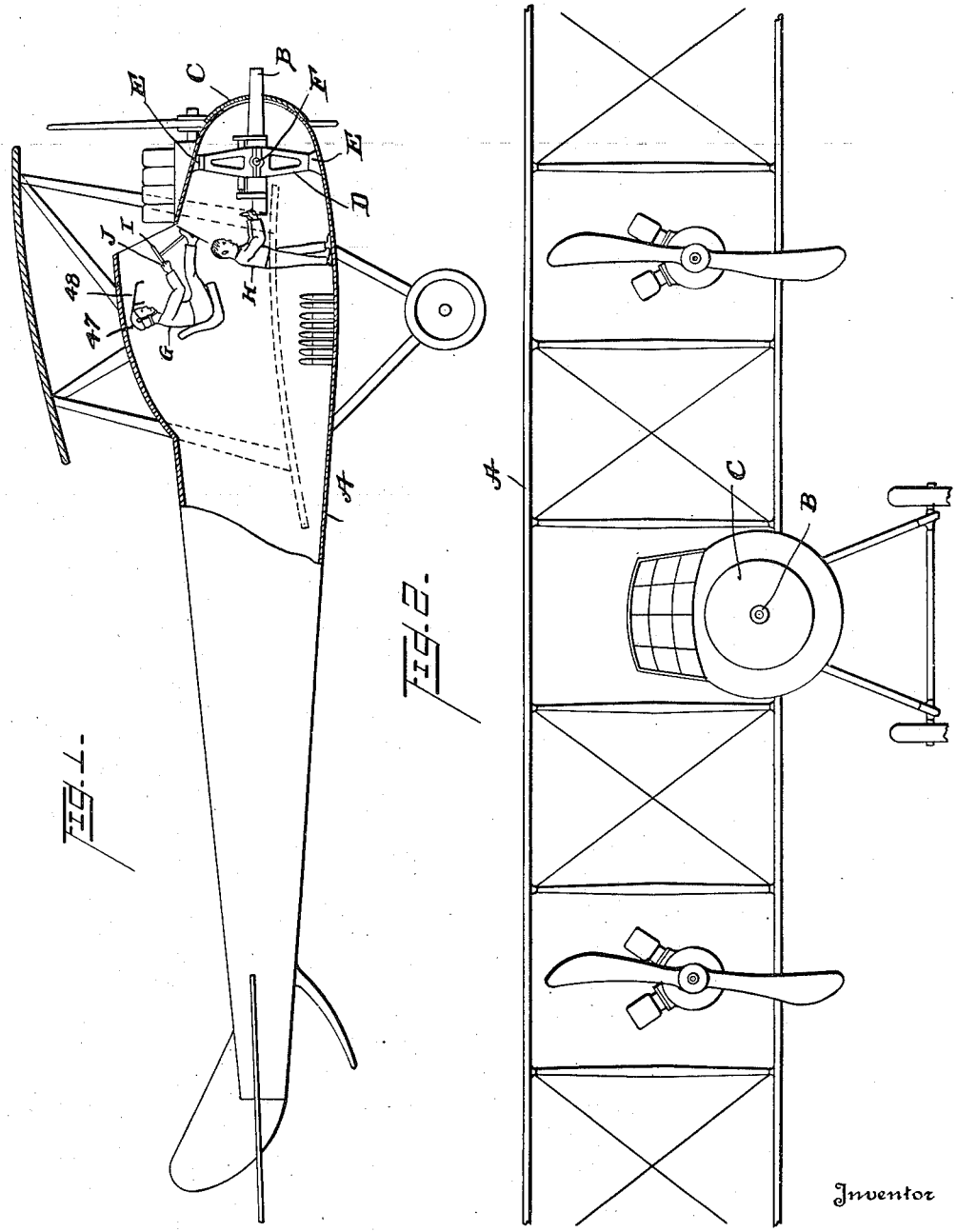

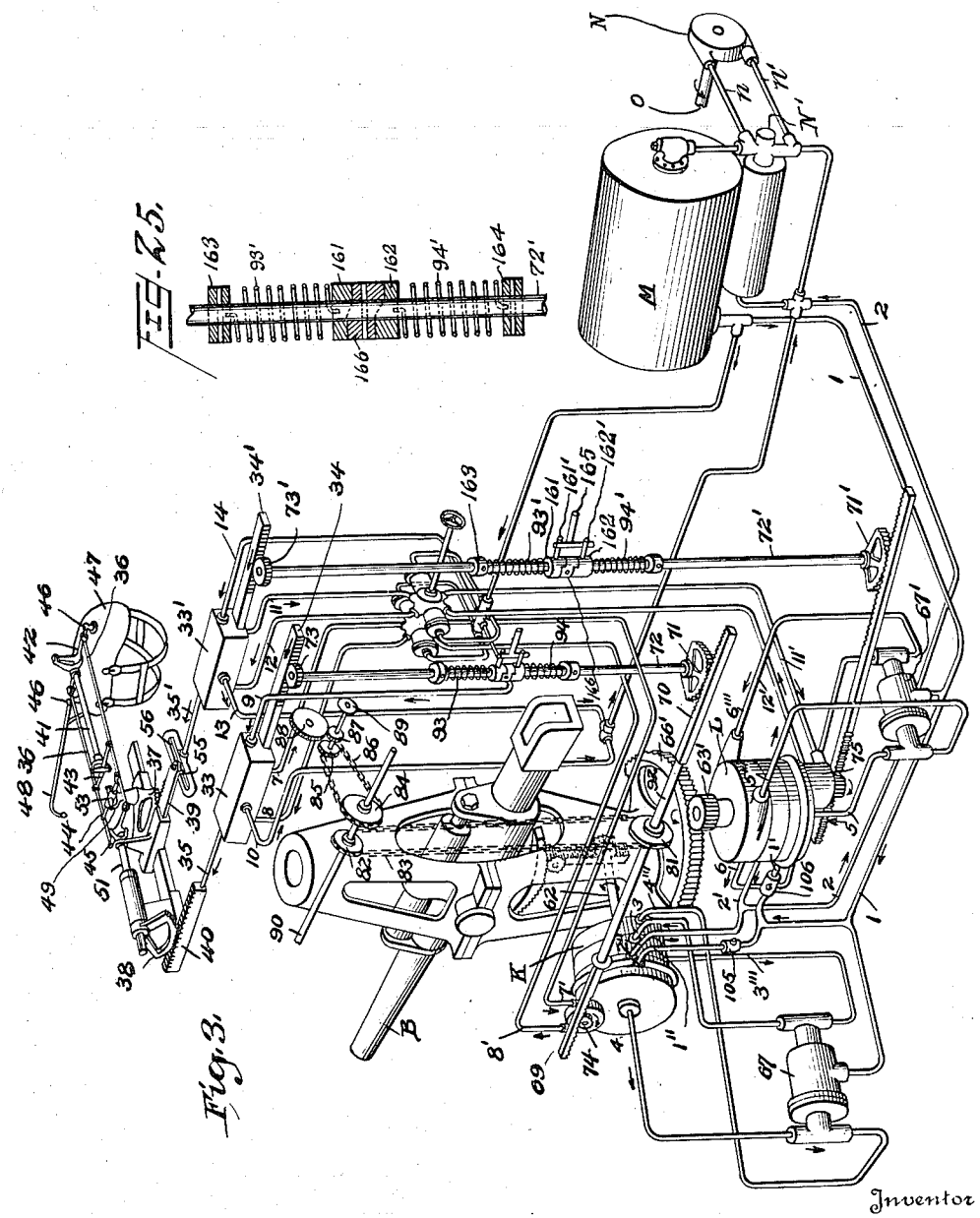

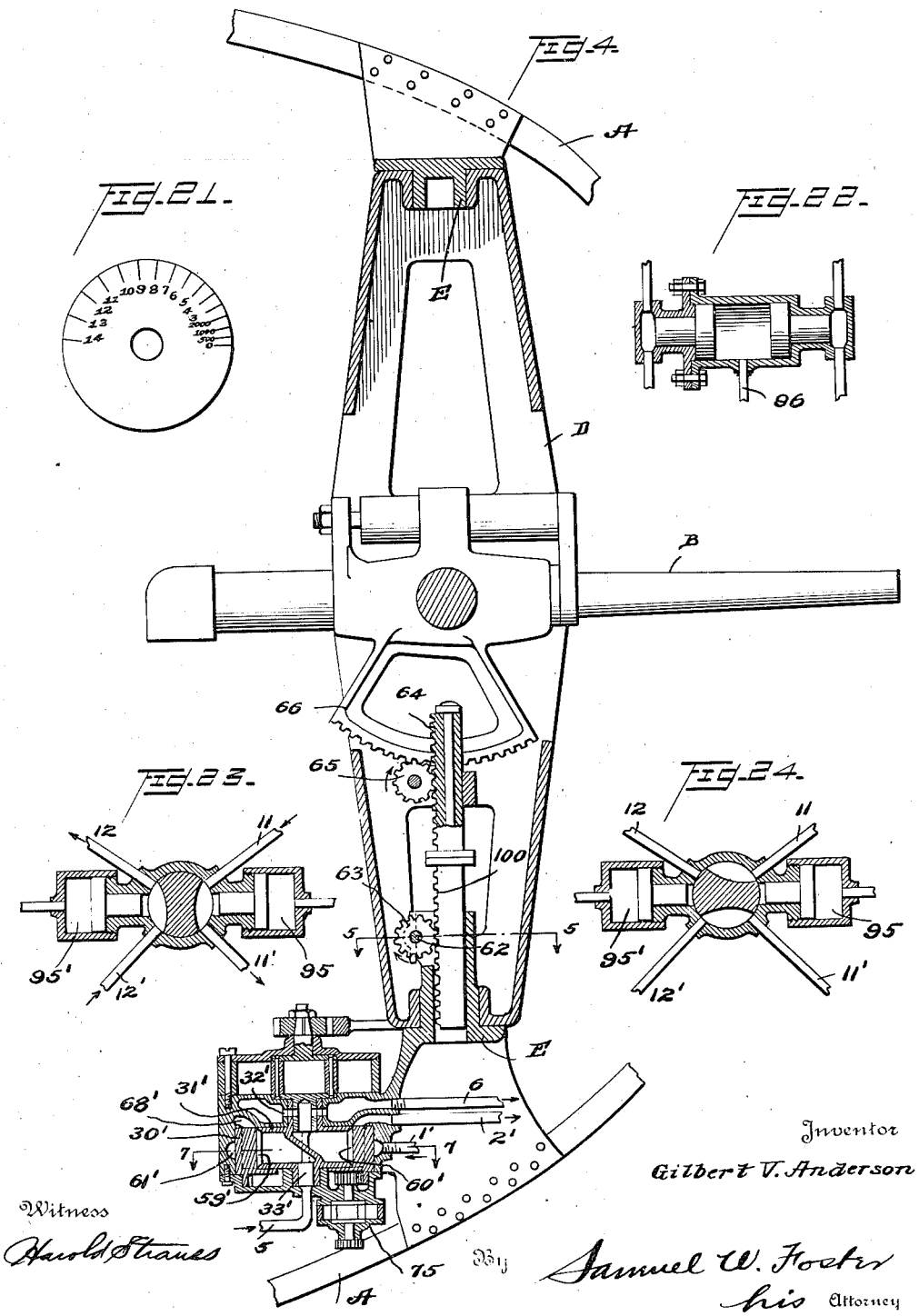

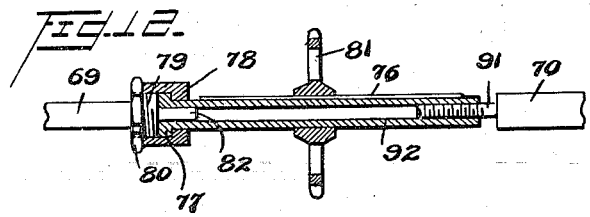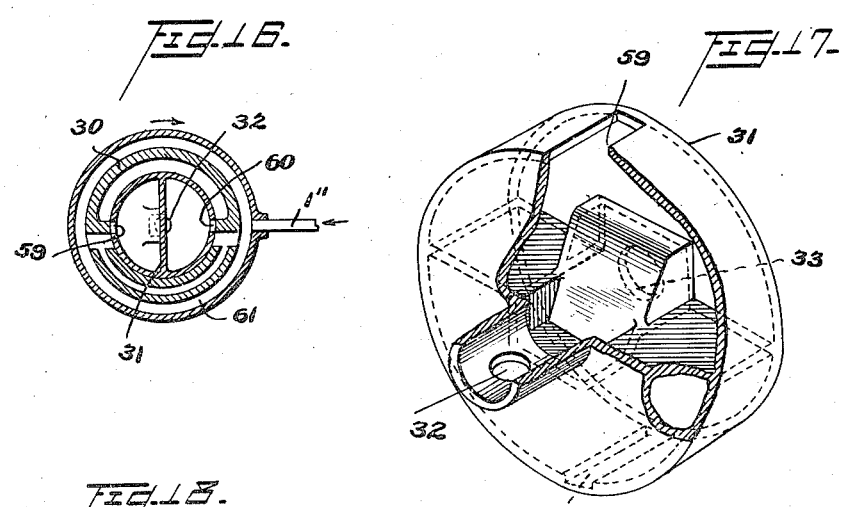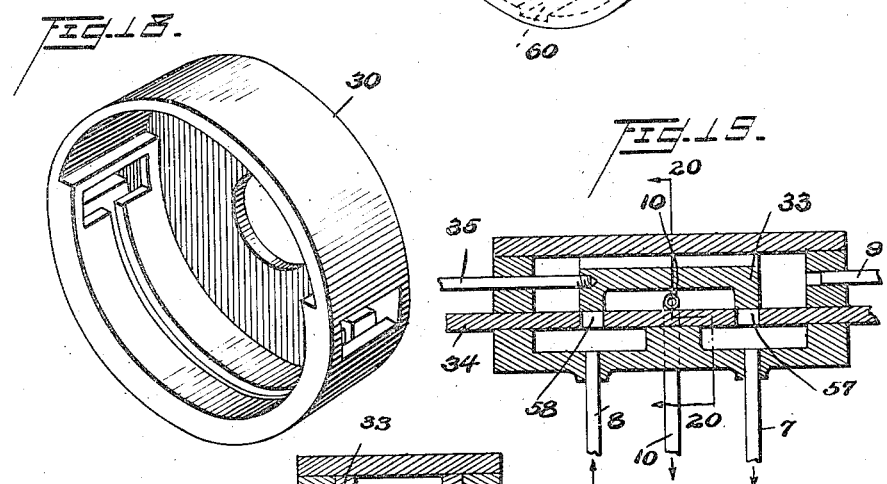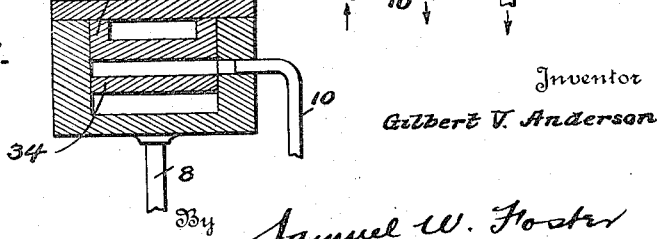

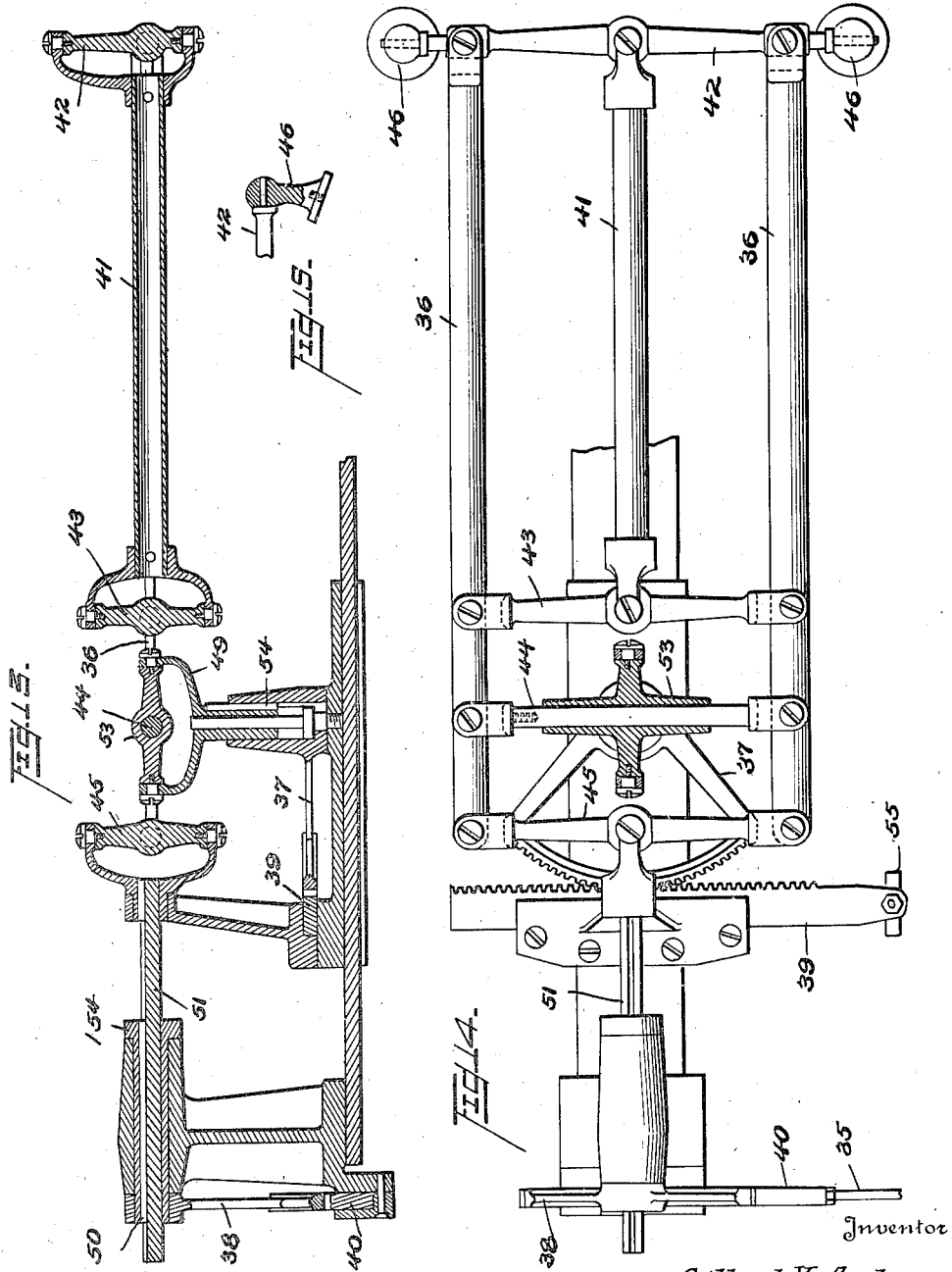

UNITED STATES PATENT OFFICE.

GILBERT V. ANDERSON, OF PHILADELPHIA, PENNSYLVANIA.

GUN MOUNT AND CONTROL.

1,387,678. Specification of Letters Patent. Patented Aug. 16, 1921.

Application filed July 5, 1917. Serial No. 178,568.

*To all whom it may concern:*

Be it known that I, GILBERT V. ANDERSON, a citizen of the United States, residing at Philadelphia, in the county of Philadelphia and State of Pennsylvania, have invented certain new and useful Improvements in Gun Mounts and Controls, of which the following is a specification.

My invention relates to improvements in gun mounts and controls, and more particularly to such apparatus on air ships, the object of the invention being to permit the employment of relatively large caliber guns so that shrapnel may be used.

A further object is to provide fluid operating means for moving the gun and provide improved mechanical means operated by a sighting device to control the fluid means and insure an automatic control of the position of the gun by the positioning of the sighting device.

A further object is to provide an improved mechanical mechanism operated by the sighting device and entirely free to move in all directions controlling the fluid mechanism so that the gun is always pointed coincident with the line of the sighting device.

The mechanism in brief consists of two reversible fluid pressure motors, one of which operates to train the gun to the right or left and the other to elevate or depress it. The working fluid is supplied from an accumulator which, in connection with a supply pump, maintains at all times a quantity of fluid in reserve at the working pressure. The flow of working fluid to each of these motors is controlled by a double valve arrangement which enables the control of these powerful operating motors to be effected by movements of the operator's head, without offering any appreciable resistance to such movements. This double valve arrangement embraces a primary and a secondary system. The secondary system consists of two small pilot motors for operating the valves of the primary system, which valves will hereafter be called the main valves. The pilot motors are controlled by small pilot valves which are operated directly by the movements of the operator's head in sighting and offer but little resistance to motion. The main valves of the primary system directly control the flow of fluid to the operating motors.

These valves are a special adaptation of the familiar slide valve which is extensively used on steam engines and other machinery and are used in connection with a follow up mechanism such as used on the steering engines, reversing gears, etc., on ships, the principle of operation being as follows:—

The valve upon being moved out of alinement with its seat uncovers its ports, allowing fluid to pass to the motor and operate it. The follow up member which is connected to the motor shaft and receives the same motion that the motor imparts to the gun is thus caused to follow the movements of the valve as the motor comes into action and as this follow up member constitutes the valve seat, it tends to reduce the effective displacement of the valve and thus restrict the flow of fluid to the motor and closes the valve entirely when the motor has caused it to move an amount equal to the displacment of the valve. When the motor is in operation and the valve is nearing the end of its movement, this restricting of the port openings, caused by the follow up member approaching its neutral or closed position with respect to the valve, increases considerably the fluid friction, both on the pressure and exhaust sides, thus retarding the operation of the motor and acting as a fluid brake which brings the gun to rest at the end of the motion without shock or over travel in all cases where the rapidity of movement of the valve is not in excess of that for which the machine is designed. As the valve mechanisms may operate in either direction and as the motor is connected to the follow up member and geared to the gun mount, the gun and follow up member are caused to move in unison and this arrangement of valves and follow up mechanisms controls the gun so that it always moves in a direction corresponding to and in amount proportional to any movement that is imparted to the valves. That is, to sight the gun in any particular direction, all that is necessary is to give the valves the required displacements.

With these and other objects in view the invention consists of certain novel features of construction and combinations and arrangements of parts as will be more fully hereinafter described and pointed out in the claims.

In the accompanying drawings in which all parts are in neutral position, unless otherwise stated:

Figure 1 is a view in longitudinal section illustrating my improvements in connection with an air ship of the battle plane type.

Fig. 2 is a view in front elevation.

Fig. 3 is an assembled view partly in perspective and more or less diagrammatically illustrates my complete apparatus for controlling the gun.

Fig. 4 is a view in vertical longitudinal section illustrating the gun moving mechanism.

Fig. 5 is a view in transverse section on the line 5—5 of Fig. 4.

Fig. 6 is a fragmentary view in section on the line 6—6 of Fig. 5.

Fig. 7 is a view in section on the line 7—7 of Fig. 4.

Fig. 8 is a view in section on the line 8—8 of Fig. 7.

Fig. 9 is a view in section illustrating the pressure supply tank and its control.

Figs. 10 and 11 show details of pipe connections.

Fig. 12 is a detail view partly in section showing the means for adjustment in changing the gun range.

Figs. 13, 14, and 15 are views in section and top plan respectively illustrating the mechanical means operated by the sighting device.

Fig. 16 is a view in section on the line 16—16 of Fig. 5.

Fig. 17 is a perspective view partly broken away illustrating the interior construction of one of the follow up members 31 and 31'.

Fig. 18 is a perspective view of one of the valves 30 and 30'.

Fig. 19 is a view in longitudinal section of one of the pilot valves.

Fig. 20 is a view in transverse section on the line 20—20 of Fig. 19.

Fig. 21 is a view of the range indicating dial.

Fig. 22 is a view in section illustrating a means for providing for the over travel of the gun, and Figs. 23 and 24 are views illustrating different positions of an operating valve. When in the position of Fig. 23, the gun follows the sight. When in the position of Fig. 24, the gun returns to neutral position irrespective of the position of the sight.

Fig. 25 is a longitudinal section showing part of Fig. 3 in enlarged form.

A represents an air ship of the battle plane type, on which I provide a gun B preferably provided with an armor plate C and mounted in a frame D. This frame D has vertical pivots E to allow the frame and gun to swing horizontally, and the gun has horizontal pivots F which allow it to pivot vertically. I preferably employ one operator G to steer the air ship, sight the gun and fire the gun and employ a second operator H to load the gun.

The operator G has a sighting device 48 secured to his head by a head piece 47 and the movement of this sighting device controls the position of the gun leaving the operator's hands free to manipulate the steering wheel I, on which a button J is located for firing the gun; the details of the firing mechanism being omitted for purposes of clearness.

The main features of my improved mechanism comprise a motor K for elevating the gun, a motor L for training or moving the gun horizontally, a pressure supply tank M causing the operation of the motors as controlled by pilot valves 33 and 33' which are caused to move by the sighting device 48.

I also provide a pump N which is continuously driven by the shaft O of one of the air ship engines. The motors and their controls are alike with the exception of certain details and hence wherever possible I have used the same reference characters to indicate like parts.

The motors K and L are controlled by main valves 30 and 30' respectively and the position of the latter are controlled by pilot motors 74 and 75 respectively.

I will now describe in detail the several novel features of my improvements and point out the operation thereof.

The main valves 30 and 30' are arranged in circular form as shown in Figs. 4, 5, 7, 16 and 18. Fig. 18 shows the valve proper and it will be seen that the upper half constitutes the simple slide valve in circular form. The follow up members 31 and 31' for these main valves are shown in Figs. 4, 5, 7, 16 and 17. They constitute the valve seats and are divided into compartments, each compartment allowing the free passage of fluid from an opening in the periphery to a corresponding opening in the end. The pilot valves 33 and 33' which are shown in Figs. 19 and 20 are simple slide valves operating in connection with the follow up members 34 and 34', which constitute their seats. Fig. 3 shows the arrangement of the pilot valves, pilot motors and follow up mechanisms in connection with the main valves and operating motors which they control.

When the fluid is allowed to pass through the main valve 30 or 30', the operating motor is rotated. This motor carries with it the corresponding "follow-up" valve seat 31 or 31', and the movement of the seat in the same direction as the valve and to the same extent, therefore, results in closure of the valve. As the "follow-up" valve seat is rotated by the movement of the motor, it, accordingly, finally "catches up" with the valve (i. e., gives the same effect so far as closure of the valve is concerned) as if the valve itself were reversely turned). The valve, therefore, is closed effectively by the movement of the seat.

The mechanism for operating the pilot valves as shown in Figs. 3, 14 and 15 consists essentially of the parallel rods 36, double forked shaft 41 and the pivoted links 42, 43, 44 and 45 arranged as shown. The forked shaft 41 insures that the links 42 and 43 lie in the same plane and the arrangement of rods 36 in connection with these links insures that the links 44 and 45 lie also in this same plane and further that all these four links at all times remain parallel to each other. Thus no matter at what angle the link 42 points within its range of operation, links 44 and 45 will always point in a direction parallel to it. Link 42 is mounted in trunnion posts 46, which are fastened to the rigid head piece 47 attached to the operator's head. The sighting means 48 which is arranged conveniently to one of the operator's eyes is also attached to the head piece and is so directed that the line of sight is parallel to the link 42. Therefore by means of this mechanism link 44 which operates the training pilot valve and link 45 which operates the elevating pilot valve are always kept parallel to the line of sight.

The line of sight may be considered as the intersection of two planes, one we call the horizontal plane and the other the vertical plane. All movements to train the gun take place in the horizontal plane and all movements to elevate or depress it take place in the vertical plane. The gear sector 37 which is caused to turn with the forked stem 49, in which the trunnion 53 is pivoted, by key 54, imparts to the training pilot valve 33', by means of the valve stem 35' to which its rack 39 is connected, a displacement proportional to the angle of train of the sighting means. Gear sector 38 which is caused to turn with the forked shaft 51, in which the link 45 is pivoted, by the key 50, imparts to the elevating pilot valve 33, by means of the valve stem 35 to which its rack 40 is connected, a displacement proportional to angle of elevation. These displacements cause the pilot motors to displace the main valves in like proportion and such displacement of the main valves cause the operating motors to impart to the gun the same angle of train and the same angle of elevation respectively as the line of sight of the sighting means which is directed by the operator.

In order that the mechanism for operating the pilot valves may allow an unrestricted movement of the operator's head within its range of operation, it is made flexible as follows. The link 44 is arranged to slide in its trunnion 53 which will allow the operator's head a certain amount of movement forward and backward, the forked stem 49 is arranged to slide up and down in the hub of gear sector 37 which will allow any desired up or down movement of the operator's head and the forked shaft 51 is arranged to slide in the bushing 154 attached to the hub of gear sector 38 and the block 55 projecting from rack 39 is arranged to slide in the slot 56 at the end of valve stem 35', so as to allow a movement of the operator's head to the right or left. Thus by means of this arrangement any movements of the operator's head within the range of operation are permitted and the pilot valves at all times receive displacements proportional to the angles of train and elevation of the line of sight.

In order that the said invention may be more clearly understood and readily carried into effect, we will describe the same operating in response to a change of direction of the line of sight, which change we will assume to consist of an elevation and a training to the right. In all drawings where arrows occur, they indicate the direction of motion of fluid or parts of mechanisms to affect these movements of the gun.

In order that the course of the motive fluid may be followed to advantage, I will describe first the operation of the pump and correlated parts shown in Figs. 3 and 9. The inlet pipes $n$ and the outlet pipes $n'$ connect through openings $n''$ and $n'''$ through a chamber $N'$, such that the pump may operate continuously by passage of the fluid through this chamber $N'$, thus by-passing the pump, as would be the case in the illustration in Fig. 9. However, when return fluid through the pipe 2, brings pressure upon the piston $N''$, the latter slides along the rod $n''''$, until this piston strikes the valve $N'''$, and moves it to the right closing the chamber $N'$. The pump immediately begins to act, drawing fluid from pipes 2 and forcing fluid into the tank M. This maintains the pressure in tank M so as to cause flow of fluid out through the pipe 1 when the valves are opened. The pump can continue to draw fluid from pipes 2, as long as there is continued operation of the motor controlling the gun position. However, when this movement of the gun stops, the pump immediately begins to exhaust fluid from the space to the left of piston $N''$, which piston, it will be remembered, is at the extreme right hand of the Fig. 9. This results in the piston $N''$ being forced to the left by the air compressed when the piston $N''$ is moved to the right, causing movement of the piston $N''$ to the left until this piston engages with collar $N''''$, at which time the valve $N'''$ is drawn to the left restoring the position of the parts as seen in Fig. 9.

Now, we will describe the operation of elevating the gun. Referring to Figs. 3, 14, 15 and 19, if the line of sight is elevated, link 45 causes the shaft 51 and gear sector 38 to rotate to the right. This causes the rack 40, valve stem 35 and elevating pilot valve 33 to take a displacement forward as indicated by the arrow and uncover port 57, allowing fluid under pressure from pipe 9 of the pressure line to pass through and out into pipe 7. At the same time it uncovers port 58, allowing fluid to return from pipe 8 through to return line 10. This flow of fluid entering the elevating pilot motor 74 at 7′ Fig. 3 and leaving at 8′ causes it to rotate in a clockwise direction, displacing the main elevating valve 30 Fig. 16 in the same direction and uncovering ports 59 and 60. This allows fluid under pressure to flow from pipe line 1 in at 1″ around the annular passage 61 through port 59 in the follow up 31 and out hole 33 Fig. 5 into pipe 4. From thence it passes by the recoil cylinders 67 Fig. 3 (to be explained later) into pipe 4‴ of the elevating motor K, causing its shaft 62 to rotate to the left as shown by the arrow. Referring to Fig. 4, this rotation of the shaft and pinion 63 causes the racks 100 and 64 to move downward, this movement causing pinion 65 to rotate in a clockwise direction which being in mesh with the gear segment 66 causes the gun to elevate. As the motor operates the fluid returns from pipe 3‴ Fig. 3 past the recoil cylinders 67 and in pipe 3. Thence it passes through the holes 32 Fig. 5 into follow up, out port 60, into the annular exhaust passage 68 and out into the return pipe line 2″.

Now to follow the operation of training the gun to the right, referring to Figs. 3, 14, 15 and 19 if the line of sight is trained to the right, the link 44 causes the forked stem 49 and gear sector 37 to turn to the right. This causes the rack 39, valve stem 35′ and training pilot valve 33′ to take a displacement forward as indicated.

Pilot valve 33′ is of the same character as pilot valve 33 and the adjoining structure of the second pilot valve is also identical so that it uncovers ports 57 and 58 in its movement, corresponding to the ports 57 and 58 uncovered by pilot valve 33. During its forward displacement, as indicated, it uncovers a port 57, allowing fluid to flow from pipe 14 of pressure line through port 57 into pipe 11 returning from pipe 12′ to pipe 12 where it passes through port 58 and into pipe 13 of the return line. This flow of fluid through the training pilot motor 75 causes it to rotate in a clockwise direction (looking down) as indicated by the arrow, displacing the main training valve 30′ Fig. 7 in the same direction and uncovering ports 59′ and 60′. This allows fluid under pressure to flow from pipe line 1 in at 1′, through port 60′ in the follow up 31′ and out hole 32′ Fig. 4 into pipe 6. From thence it passes by the recoil cylinders 67′ Fig. 3 and into pipe 6‴ of the training motor L, causing the pinion 63′ to rotate to the left which being in mesh with the training gear segment 66′ causes the gun to train to the right. As the motor operates the fluid returns from pipe 5‴ Fig. 3 past the recoil cylinders 67′ and in pipe 5. Thence it passes through hole 33′ Fig. 4 into follow up 31′ out port 59′, into the annular exhaust passage 68′ and out into the return pipe line 2′.

It is necessary in using the gun for different ranges to elevate it above the line of sight a variable amount, depending upon the range, to correct for the trajectory of the projectile, the greater the range the greater the correction necessary and vice versa. This is accomplished by introducing a means for shortening or lengthening the distance between the racks 69 and 70 Fig. 3 which in connection with gear segment 71, shaft 72, pinion 73 transmit the motion of the elevating pilot motor 74 to the follow up 34. By changing the length between these racks 69 and 70 an independent adjustment of the elevation of the gun with respect to the line of sight is accomplished. If this distance is shortened the follow up 34 is pulled back uncovering ports 57 and 58 of the elevating pilot valve Fig. 19 allowing fluid to enter pipe 7 and return through pipe 8. This as has already been explained is the direction of flow necessary to elevate the gun. As the pilot motor 74 turns in a clockwise direction in response to this flow, it moves the racks 69 and 70 toward the gear sector 71 and this motion through gear sector 71, shaft 72 and pinion 73 moves the follow up forward, returning it to its original position as the gun receives its elevation adjustment corresponding to this movement of the pilot motor. Thus the gun receives an adjustment independent of the position of the pilot valve.

Changing the length between the racks 69 and 70 is accomplished by means of the mechanism shown in detail in Fig. 12. 91 is a right handed thread projection of the rack 70, upon which is screwed the hollow shaft 92. This shaft is secured to the end of rack 69 by the collar 78 which screws upon a threaded portion 79 of rack 69 against a lock nut 80. This collar holds the flanged end 77 of shaft 92 upon the circular projection 82 and against the face 79 of rack 69, causing the hollow shaft 92 and with it rack 70 to move back and forth with rack 69, yet allowing this hollow shaft to turn. This hollow shaft has a splined projection 76 which engages a keyway in the sprocket wheel 81, through which it slides. By turning this sprocket wheel, the threaded portion 91 of rack 70 is drawn in or out of shaft 92, thus changing the distance between rack 69 and 70. Sprocket wheel 81 is connected to sprocket wheel 82 by a chain 83. Fixed upon the same shaft 90 that sprocket wheel 82 is mounted is another sprocket wheel 84 connected with sprocket wheel 85 by the chain 86. Sprocket wheel 85 is operated by a hand wheel 89, which also operates a dial 88 by means of the pinion 87 as shown. Thus to elevate the gun, the hand wheel is turned to the left which by means of the sprockets and chains turns the shaft 92 to the left which turning on the right hand screw 91 shortens the length between the racks 69 and 70 and effects this adjustment. Fig. 21 shows in detail the dial 88 and its graduations.

When the gun is not being used it is desirable to have its controls remain inoperative regardless of the movements of the operator's head. Also it is desirable to be able to bring the gun to a neutral or loading position while the gun is being loaded without regard to the movements of the operator's head. This is accompished by a special double four way valve shown in the operating position in Fig. 24. These valves are introduced in the connecting pipes between the pilot valves and their pilot motors as shown in Fig. 3. As the two parts of the valve are exactly similar, one being introduced between the training pilot valve and its pilot motor and the other between the elevating pilot valve and its pilot motor, only the one part, that which is introduced between the training pilot valve and its motor, will be described. In the operating position as shown in Fig. 23 the fluid is allowed to flow freely through pipe lines 11, 11' and 12, 12' and the operation is in all respects as has been described. But in the neutral position shown in Fig. 24 the pipes 11 and 12 which communicate with the pilot valve are both closed, preventing any flow of fluid to or from the pilot valve. Pipes 11' and 12' which communicate with the pilot motor are opened to communication with each other, allowing the pilot motor to take any movement imparted to it without resistance, as the fluid will now simply flow from one side of the motor through the pipes that are thus in communication to the other side.

On the shafts 72 and 72' Fig. 3 which are geared to the pilot motors by means of their respective gear sectors 71 and 71' are arranged a set of springs 93, 93', 94 and 94' the function of which is to return these shafts to their neutral positions when the special double four-way valves are turned to their neutral positions and the pilot motors are free to move under the action of these springs.

The function of the return springs will be best understood from examination of Fig. 3, in connection with Fig. 25.

Collars 163, 164 and 166 are fast to the shaft 72'. Spring 93' is connected with collar 163, or with the shaft at this point and spring 94' is connected with collar 164 or with the shaft at this point so that these opposite ends of these two springs are fixed angularly with respect to the shaft 72'. The opposite ends of these two springs, however, are connected with two collars, the spring 93' connected with collar 161 and the spring 94' connected with collar 162. These two collars 161 and 162 are free to rotate about the shaft 72' except as their rotation is resisted in one direction by the torsion of the spring in each case and except as rotation of collar 161 is prevented in a clockwise direction looking downward by engagement of a pin 161' with a stop, carried by arm 165; and as movement of the collar 162 is prevented in a counter-clockwise direction looking downward, by engagement of a pin 162' upon this collar, with the same stop carried by arm 165.

Each of these springs with its collar is intended to take care of return movement in one direction to the neutral and the stop is intended to bring them to rest at the neutral position. For this purpose the collars 161 and 162 are provided with cutaway portions forming shoulders facing in opposite direction in the two collars and coöperating with engaging shoulders upon the collar 166.

If the shaft 72' be now rotated in a clockwise direction looking downward, the pin 162' will move with the shaft freely away from the stop upon arm 165 and the spring 94' will not be given any torsion. However, the pin 161' cannot move on account of the engagement of this pin with the stop and the spring 93' will be given torsion as the shaft 72' is turned in this clockwise (looking downward) direction.

When the operating valve shown in Figs. 23 and 24 is turned to the position shown in Fig. 24, the two pipes 11' and 12' are fluid-connected through the valve, as seen in this figure, with the result that the pilot motor can be turned by the rack 5, through action of the segment 71' upon shaft 72'. The torsion which has been given to this spring 93' therefore results in a counter-clockwise movement (looking downwardly) of this rack segment and the rack itself, until the pin 162' engages with the stop (which corresponds with the restoring movement of this shaft 72' to neutral position).

Correspondingly, when the movement of the pilot valve moves the rack to the right in Fig. 3, and the shaft 72' is given counter-clockwise movement (looking downwardly) the pin 161' is not stopped from movement by the stop on arm 165 and it can turn so that the spring 93' is not given any torsion; but the pin 162' cannot turn on account of the stop and spring 94' is given a torsion which will tend to force the shaft 72' in a clockwise direction (looking downwardly) when it is free to spring in this direction. As soon as the valve shown in Fig. 24 is brought to the position shown in Fig. 24, so that the pipes 11' and 12' may short-circuit through the valve, this spring 94' exerts its tension through the shaft 72' and segment gear 71' to move the rack 5 toward the left in Fig. 3 and restore the parts to the position shown in Fig. 3.

The neutral positions of these shafts are such that the pilot motors to which they are geared, and which in turn are geared to the main valves as shown in Fig. 4, will cause the main valves to assume a position of rest corresponding to the desired neutral or loading position of the gun. To bring the operation of the gun under the control of the sighting means again, it is only necessary to turn these double valves to the operating position as in Fig. 23. Then the pilot motors are again under the direct control of their respective pilot valves and should there be a displacement of either of the pilot valves with respect to its follow up because of the line of sight not being coincident with the neutral position of the gun, such displacement will cause operation of the pilot motors and main valves' and motors so as to bring the gun to point parallel to the line of sight.

In order to provide for the over travel of the gun in cases where the rapidity of movement of the sighting means is in excess of that for which the machine was designed, recoil cylinders 67 and 67' shown in detail in Fig. 22 are provided. They consist essentially of double diameter pistons, the large diameters being in direct communication with the pressure line of the working fluid at 96. The small diameters are in communication with the pipe lines connecting between the motors and valves. Whenever there is an exceedingly rapid movement of the valves, the follow up does not follow close enough to properly throttle the valve ports (and thus check the movement) as it nears the end of its stroke as has been previously explained, instead the valve is practically full open until later at the end of its movement, the follow up moving in unison with the gun has reached or approached the neutral position of the valve, then the throttling of the openings tending to check the movement which has by now acquired considerable velocity produces an excessive pressure in the return line.

The production of this excessive pressure may be explained by the fact that the discharge side of the motor acts as a pump, the vanes V Fig. 6 serving to force the fluid through the discharge line. When an exceedingly rapid movement is imparted to the valve, the motor, in this case, will be rotating at high velocity near the end of the movement and pumping fluid through the throttled discharge valve passage at a rapid rate. This condition builds up the fluid friction considerably and requires a considerable pressure to force the fluid through the restricted opening of the discharge valve into the discharge line. In some cases this pressure in the discharge pipe from the motor to the valve may become quite in excess of the working pressure in the supply line.

The function of the pressure line operating through pipe 96 in this case is purely that of a spring initially, allowing the additional fluid to flow into the high pressure side and itself constituting the low pressure side when the pressure in the pipes connecting the motor with the valve is excessive. This excessive pressure is due to the inertia of the heavy gun parts which has not been wholly stopped by the increase of friction in the outlet or discharge from these pipes. As it increases, the pistons in the cylinder shown in Fig. 22, move toward each other one at a time, according to which is in operation, compressing the main motive fluid between. Thus, the piston at the left, will move toward the right with one direction of movement of the gun and the piston at the right will move toward the left with another direction of movement of the gun. In either case, the main motive fluid will subsequently restore the piston to the position shown in Fig. 22, turning the gun back the distance of its overtravel and restoring normal pressure conditions in the connection. As both pipes connecting the motor with the valve are provided with recoil cylinders, that one which happens to be in the particular line through which the fluid is returning will take up this extra pressure on the small end of the piston and allow the gun to over travel until its energy has been absorbed, as it comes to the end of its movement; then this extra pressure acting on the vanes of the motor on the exhaust side will rotate it in the opposite direction and quickly return the gun to the proper position which will correspond to the position of the valve. Suitable check valves 105 and 106 are placed in the main pressure line just at the openings into the main valves to prevent this extra pressure from escaping through the pressure line when the follow up, which moves in unison with the gun, over travels the valve as the gun over travels its position corresponding to the valve. Similar recoil cylinders may be provided for the pilot systems as shown at 95 and 95' in Fig. 23 to provide for the over travel of the pilot motors and main valves, which would also occur in case of an excessive rapidity of movement of the sighting means.

Various slight changes may be made in the general form and arrangement of parts described without departing from my invention and hence I do not limit myself to the precise details set forth, but consider myself at liberty to make such changes and alterations as fairly fall within the spirit and scope of the appended claims.

Having fully described my invention, what I claim as new and desire to secure by Letters Patent is:

1. The combination with an air ship, of a gun thereon, a sighting device adapted to be secured to the operator's head, and fluid pressure means compelling the gun to move in unison with the sighting device.

2. The combination with an air ship, of a gun thereon, a sighting device adapted to be secured to the operator's head, fluid motors for moving the gun, and pilot valves controlling the motors and moved by the sighting device.

3. The combination with a gun, of fluid pressure means for moving the gun horizontally and vertically in sighting, a sighting device, and pilot valves operated by the sighting device to control the fluid pressure means.

4. The combination with a gun, of a fluid motor constructed to elevate the gun, a second fluid motor constructed to train the gun, pilot valves controlling the motors, and a sighting device controlling the pilot valves to obtain automatic adjustment in all positions by adjustment in two planes at the same time.

5. The combination with a gun, of a fluid motor constructed to elevate the gun a second fluid motor constructed to train the gun, valves controlling the movements of the motors, pilot motors controlling said valves, pilot valves controlling the pilot motors, and a sighting device controlling the pilot valves.

6. The combination with a gun, of a fluid motor constructed to elevate the gun, a second fluid motor constructed to train the gun, valves controlling the motors, a sighting device, and means connected to the sighting device and controlling both valves to automatically control all positions of the gun.

7. The combination with a gun of a primary pressure system of motors and valves for moving the gun, a secondary system of motors and valves controlling the primary system, and a sighting device controlling the secondary system.

8. The combination with an air ship, of a gun thereon, a sighting device adapted to be secured to the operator's head, fluid pressure means comprising a set of fluid-pressure motors with valves for controlling said motors compelling the gun to move in unison with the sighting device, movable valve seats for said valves, and means automatically moving said seats compelling them to follow up and shut off the fluid.

9. The combination with an air ship, of a gun thereon, a sighting device adapted to be secured to the operator's head, fluid motors for moving the gun, pilot valves controlling the motors and moved by the sighting device, movable valve seats for said valves, and means automatically moving said seats compelling them to follow up and shut off the fluid.

10. The combination with a gun, of fluid pressure means for moving the gun in sighting, a sighting device, valves operated by the sighting device to control the fluid pressure means, movable valve seats for said valves, and means automatically moving said seats compelling them to follow up and shut off the fluid.

11. The combination with a gun, of a fluid motor constructed to elevate the gun, a second fluid motor constructed to train the gun, pilot valves controlling the motors, a sighting device controlling the pilot valves, movable valve seats for said valves, and means automatically moving said seats compelling them to follow up and shut off the fluid.

12. The combination with a gun, of a fluid motor constructed to elevate the gun, a second fluid motor constructed to train the gun, valves controlling the movements of the motors, pilot motors controlling said valves, pilot valves controlling the pilot motors, a sighting device controlling the pilot valves, movable valve seats for said valves, and means automatically moving said seats compelling them to follow up and shut off the fluid.

13. The combination with a gun, of a fluid motor constructed to elevate the gun, a second fluid motor constructed to train the gun, valves controlling the motors, a sighting device, means connected to the sighting device and controlling both valves, movable valve seats for said valves, and means automatically moving said seats compelling them to follow up and shut off the fluid.

14. The combination with a gun of a primary pressure system of motors and valves for moving the gun, a secondary system of motors and valves controlling the primary system, a sighting device controlling the secondary system, movable valve seats for said valves, and means automatically moving said seats compelling them to follow up and shut off the fluid.

15. The combination with an air ship, of a gun thereon, a sighting device therefor, fluid pressure means set in motion by the sighting device and controlling the position of the gun, and fluid operated means-compensating for sudden movements of the sighting device.

16. The combination with an air ship, of a gun thereon, fluid pressure means for moving the gun, a sighting device controlling the operation of the fluid pressure means, and fluid operated means compensating for sudden movements of the sighting device.

17. The combination with an air ship, of a gun thereon, a sighting device adapted to be secured to the operator's head, fluid pressure means compelling the gun to follow the sighting device, and fluid operated means compensating for sudden movements of the sighting device.

18. The combination with an air ship, of a gun thereon, a sighting device adapted to be secured to the operator's head, fluid motors for moving the gun, pilot valves controlling the motors and moved by the sighting device, and fluid operated means compensating for sudden movements of the sighting device.

19. The combination with a gun, of fluid pressure means for moving the gun in sighting, a sighting device, pilot valves operated by the sighting device to control the fluid pressure means, and fluid operated means compensating for sudden movements of the sighting device.

20. The combination with a gun, of a fluid motor constructed to elevate the gun, a second fluid motor constructed to train the gun, pilot valves controlling the motors, a sighting device controlling the pilot valves, and fluid operated means compensating for sudden movements of the sighting device.

21. The combination with a gun, of a fluid motor constructed to elevate the gun a second fluid motor constructed to train the gun, valves controlling the movements of the motors, pilot motors controlling said valves, pilot valves controlling the pilot motors, a sighting device controlling the pilot valves, and fluid operated means compensating for sudden movements of the sighting device.

22. The combination with a gun, of a fluid motor constructed to elevate the gun, a second fluid motor constructed to train the gun, valves controlling the motors, a sighting device, means connected to the sighting device and controlling both valves, and fluid operated means compensating for sudden movements of the sighting device.

23. The combination with a gun of a primary pressure system of motors and valves for moving the gun, a secondary system of motors and valves controlling the primary system, a sighting device controlling the secondary system, and fluid operated means compensating for sudden movements of the sighting device.

24. The combination with an air ship, of a gun thereon, a sighting device adapted to be secured to the operator's head, fluid pressure means including valves, compelling the gun to follow the sighting device, movable valve seats for said valves, means automatically moving said seats compelling them to follow up and shut off the fluid, and fluid operated means compensating for sudden movements of the sighting device.

25. The combination with an air ship, of a gun thereon, a sighting device adapted to be secured to the operator's head, fluid motors for moving the gun, pilot valves controlling the motors and moved by the sighting device, movable valve seats for said valves, means automatically moving said seats compelling them to follow up and shut off the fluid, and fluid operated means compensating for sudden movements of the sighting device.

26. The combination with a gun, of fluid pressure means for moving the gun in sighting, a sighting device, pilot valves operated by the sighting device to control the fluid pressure means, movable valve seats for said valves, means antomatically moving said seats compelling them to follow up and shut off the fluid, and fluid operated means compensating for sudden movements of the sighting device.

27. The combination with a gun, of a fluid motor constructed to elevate the gun, a second fluid motor constructed to train the gun, pilot valves controlling the motors, a sighting device controlling the pilot valves, movable valve seats for said valves, means automatically moving said seats compelling them to follow up and shut off the fluid, and fluid operated means compensating for sudden movements of the sighting device.

28. The combination with a gun, of a fluid motor constructed to elevate the gun, a second fluid motor constructed to train the gun, valves controlling the movements of the motors, pilot motors controlling said valves, pilot valves controlling the pilot motors, a sighting device controlling the pilot valves, movable valve seats for said valves, means automatically moving said seats compelling them to following up and shut off the fluid, and fluid operated means compensating for sudden movements of the sighting device.

29. The combination with a gun, of a fluid motor constructed to elevate the gun, a second fluid motor constructed to train the gun, valves controlling the motors, a sighting device, means connected to the sighting device and controlling both valves, movable valve seats for said valves, means automatically moving said seats compelling them to follow up and shut off the fluid, and fluid operated means compensating for sudden movements of the sighting device.

30. The combination with a gun of a primary pressure system of motors and valves for moving the gun, a secondary system of motors and valves controlling the primary system, a sighting device controlling the secondary system, movable valve seats for said valves, means automatically moving said seats compelling them to follow up and shut off the fluid, and fluid operated means compensating for sudden movements of the sighting device.

31. The combination with an air ship, of a gun thereon, sighting means therefor, fluid pressure means controlling the position of the gun, causing it to follow the sighting means and means independent of the sighting means permitting the return of the gun to normal or loading position.

32. The combination with an air ship, of a gun thereon, fluid pressure means for moving the gun, a sighting device controlling the operation of the fluid pressure means, and means independent of the sighting means permitting the return of the gun to normal or loading position.

33. The combination with an air ship, of a gun thereon, a sighting device, a head piece secured thereto adapted to be secured to the operator's head, fluid pressure means compelling the gun to follow the device, and means independent of the sighting means permitting the return of the gun to normal or loading position.

34. The combination with an air ship, of a gun thereon, a sighting device adapted to be secured to the operator's head, fluid motors for moving the gun, pilot valves controlling the motors and moved by the sighting device, and means independent of the sighting means permitting the return of the gun to normal or loading position.

35. The combination with a gun, of fluid pressure means for moving the gun in sighting, a sighting device, pilot valves operated by the sighting device to control the fluid pressure means, and means independent of the sighting means permitting the return of the gun to normal or loading position.

36. The combination with a gun, of a fluid motor constructed to elevate the gun, a second fluid motor constructed to train the gun, pilot valves controlling the motors, a sighting device controlling the pilot valves, and means independent of the sighting means permitting the return of the gun to normal or loading position.

37. The combination with a gun, of a fluid motor constructed to elevate the gun a second fluid motor constructed to train the gun, valves controlling the movements of the motors, pilot motors controlling said valves, pilot valves controlling the pilot motors, a sighting device controlling the pilot valves, and means independent of the sighting means permitting the return of the gun to normal or loading position.

38. The combination with a gun, of a fluid motor constructed to elevate the gun, a second fluid motor constructed to train the gun, valves controlling the motors, a sighting device, means connected to the sighting device and controlling both valves, and means independent of the sighting means permitting the return of the gun to normal or loading position.

39. The combination with a gun of a primary pressure system of motors and valves for moving the gun, a secondary system of motors and valves controlling the primary system, a sighting device controlling the secondary system, and means independent of the sighting means permitting the return of the gun to normal or loading position.

40. The combination with an air ship, of a gun thereon, a sighting device, a head piece fastened thereto adapted to be secured to the operator's head, fluid pressure means including valves compelling the gun to follow the device, movable valve seats for said valves, means automatically moving said seats compelling them to follow up and shut off the fluid, and means independent of the sighting means permitting the return of the gun to normal or loading position.

41. The combination with an air ship, of a gun thereon, a sighting device adapted to be secured to the operator's head, fluid motors for moving the gun, pilot valves controlling the motors and moved by the sighting device, movable valve seats for said valves, means automatically moving said seats compelling them to follow up and shut off the fluid, and means independent of the sighting means permitting the return of the gun to normal or loading position.

42. The combination with a gun, of fluid pressure means for moving the gun in sighting, a sighting device, pilot valves operated by the sighting device to control the fluid pressure means, movable valve seats for said valves, means automatically moving said seats compelling them to follow up and shut off the fluid, and means independent of the sighting means permitting the return of the gun to normal or loading position.

43. The combination with a gun, of a fluid motor constructed to elevate the gun, a second fluid motor constructed to train the gun, pilot valves controlling the motors, a sighting device controlling the pilot valves, movable valve seats for said valves, means automatically moving said seats compelling them to follow up and shut off the fluid, and means independent of the sighting means permitting the return of the gun to normal or loading position.

44. The combination with a gun, of a fluid motor constructed to elevate the gun, a second fluid motor constructed to train the gun, valves controlling the movements of the motors, pilot motors controlling said valves, pilot valves controlling the pilot motors, a sighting device controlling the pilot valves, movable valve seats for said valves, means automatically moving said seats compelling them to follow up and shut off the fluid, and means independent of the sighting means permitting the return of the gun to normal or loading position.

45. The combination with a gun, of a fluid motor constructed to elevate the gun, a second fluid motor constructed to train the gun, valves controlling the motors, a sighting device, means connected to the sighting device and controlling both valves, movable valve seats for said valves, means automatically moving said seats compelling them to follow up and shut off the fluid, and means independent of the sighting means permitting the return of the gun to normal or loading position.

46. The combination with a gun of a primary pressure system of motors and valves for moving the gun, a secondary system of motors and valves controlling the primary system, a sighting device controlling the secondary system, movable valve seats for said valves, means automatically moving said seats compelling them to follow up and shut off the fluid, and means independently of the sighting means permitting the return of the gun to normal or loading position.

47. The combination with a gun, of a sighting device, a head piece therefor adapted to be secured to the operator's head, and fluid pressure means compelling the gun to follow the device.

48. The combination with a gun, of a sighting device adapted to be secured to the operator's head, fluid motors for moving the gun and valves for controlling the motors and moved by the sighting device.

49. The combination with an air ship, of a gun thereon, fluid pressure means controlling the position of the gun in different planes and having a common control, and separate gun range adjusting means, correcting all vertical positions of the gun.

50. The combination with an air ship, of a gun thereon, fluid pressure means for moving the gun, a sighting device controlling the operation of the fluid pressure means, and gun range adjusting means independent of the sighting device.

51. The combination with an air ship, of a gun thereon, a sighting device a head piece therefor adapted to be secured to the operator's head, fluid pressure means compelling the gun to follow the device, and gun range adjusting means independent of the sighting device.

52. The combination with an air ship, of a gun thereon, a sighting device adapted to be secured to the operator's head, fluid motors for moving the gun, pilot valves controlling the motors and moved by the sighting device, and gun range adjusting means independent of the sighting device.

53. The combination with a gun, of fluid pressure means for moving the gun in sighting, a sighting device, pilot valves operated by the sighting device to control the fluid pressure means, and gun range adjusting means independent of the sighting device.

54. The combination with a gun, of a fluid motor constructed to elevate the gun, a second fluid motor constructed to train the gun, pilot valves controlling the motors, a sighting device controlling the pilot valves, and gun range adjusting means independent of the sighting device.

55. The combination with a gun, of a fluid motor constructed to elevate the gun a second fluid motor constructed to train the gun, valves controlling the movements of the motors, pilot motors controlling said valves, pilot valves controlling the pilot motors, a sighting device controlling pilot valves, and gun range adjusting means independent of the sighting device.

56. The combination with a gun, of a fluid motor constructed to elevate the gun, a second fluid motor constructed to train the gun, valves controlling the motors, a sighting device, means connected to the sighting device and controlling both valves, and gun range adjusting means independent of the sighting device.

57. The combination with a gun of a primary pressure system of motors and valves for moving the gun, a secondary system of motors and valves controlling the primary system, a sighting device controlling the secondary system, and gun range adjusting means independent of the sighting device.

In testimony whereof I have signed my name to this specification in the presence of two subscribing witnesses.

GILBERT V. ANDERSON.

Witnesses:
HAROLD STRAUSS,
AGNES M. COTTER.